United States Patent
Western

[19]

[11] Patent Number: 6,139,033
[45] Date of Patent: Oct. 31, 2000

[54] STABLE MONOWHEEL TRAVOIS WITH COUNTERWEIGHT FEATURE

[76] Inventor: David Owen Western, 818 N. Westwood St., Mesa, Ariz. 85201

[21] Appl. No.: 09/197,359

[22] Filed: Nov. 20, 1998

[51] Int. Cl.$^7$ .................................................. B62B 1/00
[52] U.S. Cl. .................... 280/47.23; 280/1.5; 280/47.32; 280/659
[58] Field of Search .......................... 280/78, 1.5, 47.26, 280/47.31, 47.32, 47.2, 47.23, 43, 43.1, 7.14, 659

[56] References Cited

U.S. PATENT DOCUMENTS

| | | | |
|---|---|---|---|
| D. 424,266 | 5/2000 | McIntyre | D34/24 |
| 2,613,953 | 10/1952 | Giovannoni | 280/1.5 |
| 2,629,608 | 2/1953 | Jones | 280/653 |
| 3,628,806 | 12/1971 | Weber et al. | 280/63 |
| 4,171,139 | 10/1979 | Cockram | 280/652 |
| 4,175,762 | 11/1979 | Vaughn et al. | 280/78 |
| 4,664,395 | 5/1987 | McCoy | 280/1.5 |
| 4,838,565 | 6/1989 | Douglas et al. | 280/1.5 |
| 5,062,651 | 11/1991 | Varieur | 280/1.5 |
| 5,265,891 | 11/1993 | Diehl | 280/1.5 |
| 5,385,355 | 1/1995 | Hoffman | 280/1.5 |
| 5,511,802 | 4/1996 | Aitken | 280/1.5 |
| 5,687,978 | 11/1997 | Rhoades et al. | 280/30 |
| 6,039,333 | 3/2000 | Hamblin | 280/47.18 |
| 6,050,576 | 4/2000 | Tanner et al. | 280/47.21 |
| 6,050,577 | 4/2000 | Smith | 280/47.24 |

*Primary Examiner*—Brian L. Johnson
*Assistant Examiner*—Daniel Yeagley
*Attorney, Agent, or Firm*—Baker & Maxham

[57] ABSTRACT

A stable monowheel travois for carrying a load behind an individual comprising a frame assembly with a forward section and a rear section, the rear section adjustably engaged with an axle that is rotatably coupled to a wheel. Adjustable downward extending brackets position the rear section below the axle to minimize the distance between the load and the ground, thereby minimizing tilting forces. A portion of the rear section extends behind the axle which allows for a load to be placed thereon creating a counterweight torque about the axle, thus decreasing the weight on the operator pulling the travois.

19 Claims, 4 Drawing Sheets

STABLE MONOWHEEL TRAVOIS WITH COUNTERWEIGHT FEATURE

BACKGROUND OF THE INVENTION

1. Field of the Invention

The present invention relates generally to wheeled load carriers towed behind an individual, and more particularly to a stable monowheel travois with a counterweight feature.

2. Discussion of the Related Art

History presents a diverse array of devices which may be used to tow or pull a load behind an individual. The purpose of these devices is to assist an individual in transporting the load, especially those loads weighing more than an individual may comfortably carry for any significant distance. These apparatus generally have some type of frame for supporting the load, or cargo and one or more wheels. Of particular interest herein is a device commonly referred to as a travois, which is towed behind an operator and has a load carrying frame with a single wheel.

The single wheeled, or monowheel travois is most efficient because it is generally smaller and lighter than multi-wheeled carriers allowing it to navigate narrow trails and turn very quickly and easily. However, several problems exist with monowheel travois designs, including lack of stability, an adequate stand-alone capability, and leg or foot contact by the operator when pulling the travois.

The critical problem of a monowheel configuration is the inherent instability of a single wheel. The load carried on the travois has a center of gravity, which is the point though which the earth's gravitational force is exerted. The gravitational force is counteracted though the tire contact patch, which is the point of contact between the wheel, or tire and the ground. When the center of gravity of the cargo is not aligned with the contact patch it forces the travois to tilt, or lose balance. Also, the higher the center of gravity is above the contact patch, the greater force it will exert when it is not aligned, because the span between the center of gravity and the contact patch behaves like a lever to assist the center of gravity in tilting the travois. The lever, or span is known as a torque arm, and the tilting force is known as a torque, or torque force. The longer the torque arm, the greater the torque force.

There are two important travois torque arms. First, the tilting torque arm, discussed above, is a side-to-side, or transverse torque arm that causes the travois to tip from side-to-side. The transverse torque arm produces a torque force when the center of gravity of the cargo is positioned to the left or the right of the tire contact patch, as seen from the perspective of the operator pulling the travois. The second torque arm is a front-to-rear or longitudinal torque arm. It produces a torque force when the center of gravity of the cargo is forward-of or behind the tire contact patch, as seen from the perspective of the operator pulling the travois. This results in a longitudinal torque force that pushes the front of the travois down towards the ground resulting in what the operator feels as a weight that must be supported while pulling the travois. The length of both torque arms is the distance from the cargo's center of gravity to the contact patch.

Rather than addressing the direct cause of the monowheel travois instability problem, i.e., the length of the torque arms, and the resulting increased torque forces, existing devices simply use the operator to counter the torques generated by the load's center of gravity. This method does not decrease the size, or magnitude of the travois torques, but rather forces the operator to constantly counteract the large torque forces. Ceaselessly balancing, and supporting the travois soon tires and irritates the operator which explains why these devices are not in common use today in spite of their numerous advantages over larger and heavier multi-wheeled carriers. Accordingly, there is still a need for a monowheel travois that is stable and easy to operate.

SUMMARY OF THE INVENTION

It is the primary object of the present invention to provide a monowheel travois having greatly improved stability characteristics.

In a preferred embodiment of the present invention, a monowheel travois is provided with a frame assembly having a rear section that is positioned below the monowheel axle for greatly improved stability by minimizing the torque arms. Also, the rear frame section extends behind the monowheel axle so that when a load is mounted on the rear section it exerts a longitudinal counterweight torque about the axle decreasing the weight at the forward end of the frame where the frame attaches to the operator.

A monowheel travois embodying the invention is stable, and also minimizes and counteracts the torque forces experienced by the operator pulling the travois.

BRIEF DESCRIPTION OF THE DRAWINGS

The nature, objects, and advantages of the invention will become more apparent to those skilled in the art after considering the following detailed description in connection with the accompanying drawings, illustrating by way of example the principles of the invention, in which like reference numerals designate like parts throughout, wherein.

DETAILED DESCRIPTION OF THE PREFERRED EMBODIMENTS

General

Figure 1:
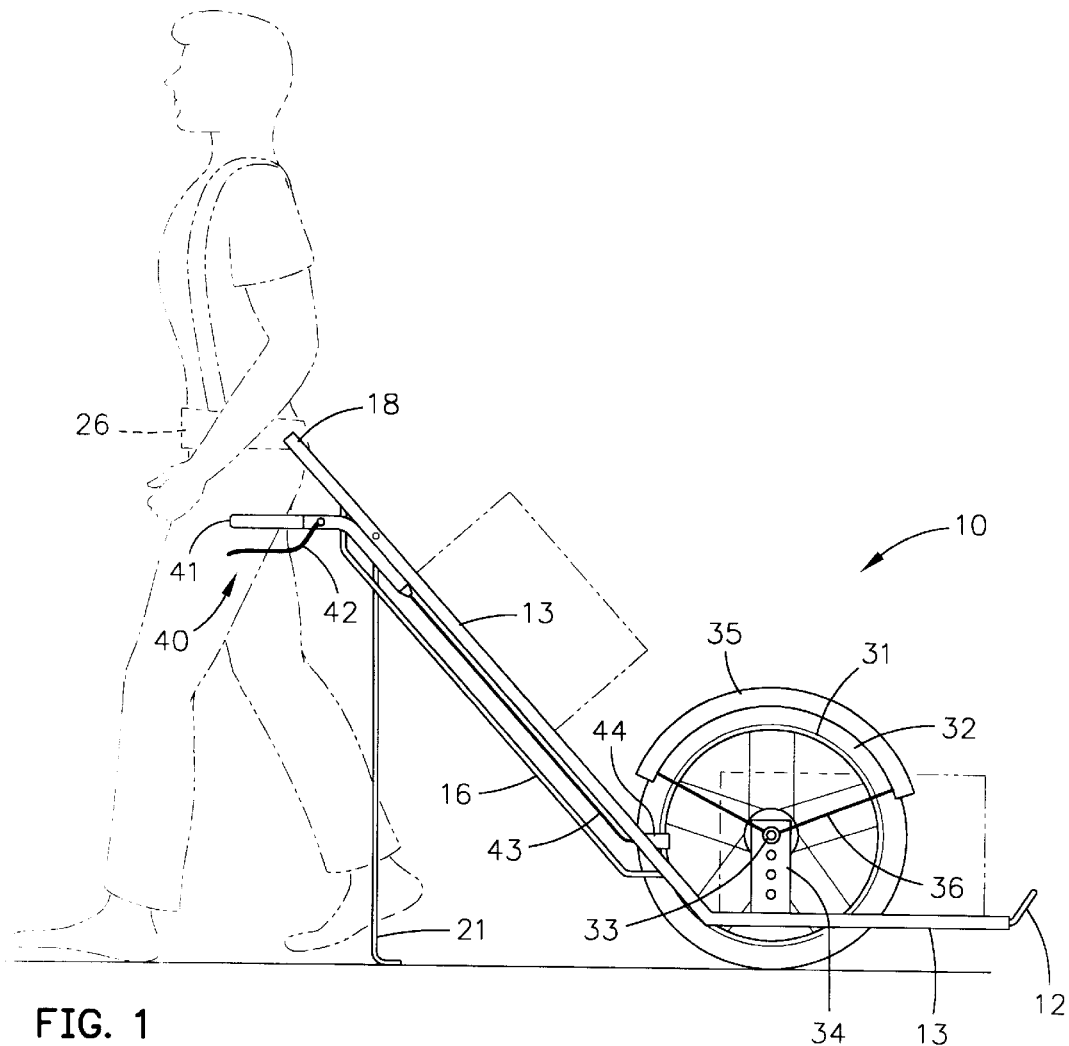
FIG. 1 is a side elevation view of a preferred embodiment of the present invention.

As shown in the drawings for purposes of illustration, a monowheel travois with a counterweight feature in accordance with one embodiment of the invention is illustrated and designated generally by the numeral 10. A monowheel travois according to the invention allows the load, or cargo to be positioned on the travois so that the center of gravity of the cargo is close to the ground and close to the wheel, and the tire contact patch, thus minimizing the transverse torque arm, thereby greatly reducing the torque forces that unbalance the travois. In addition, a monowheel travois according to the invention permits cargo to be loaded behind the axle creating a longitudinal counterweight torque force that decreases the weight at the forward end of the travois were the operator is located. Various travois designs exist, but they are not stable because they have not minimized the torque arms generated by the cargo.

Structure

Figure 2:
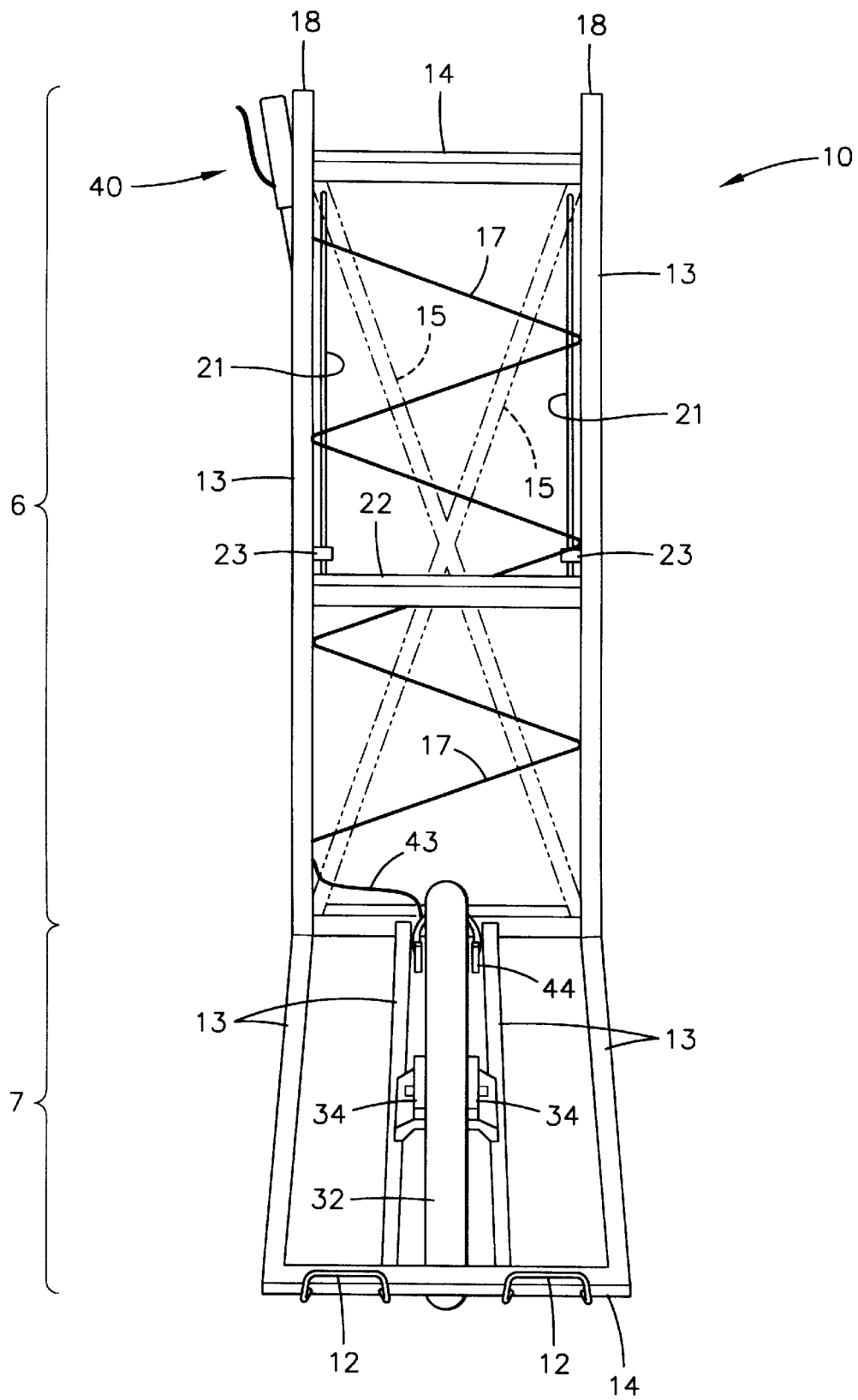
FIG. 2 is a plan view of the embodiment of FIG. 1.
Figure 4:
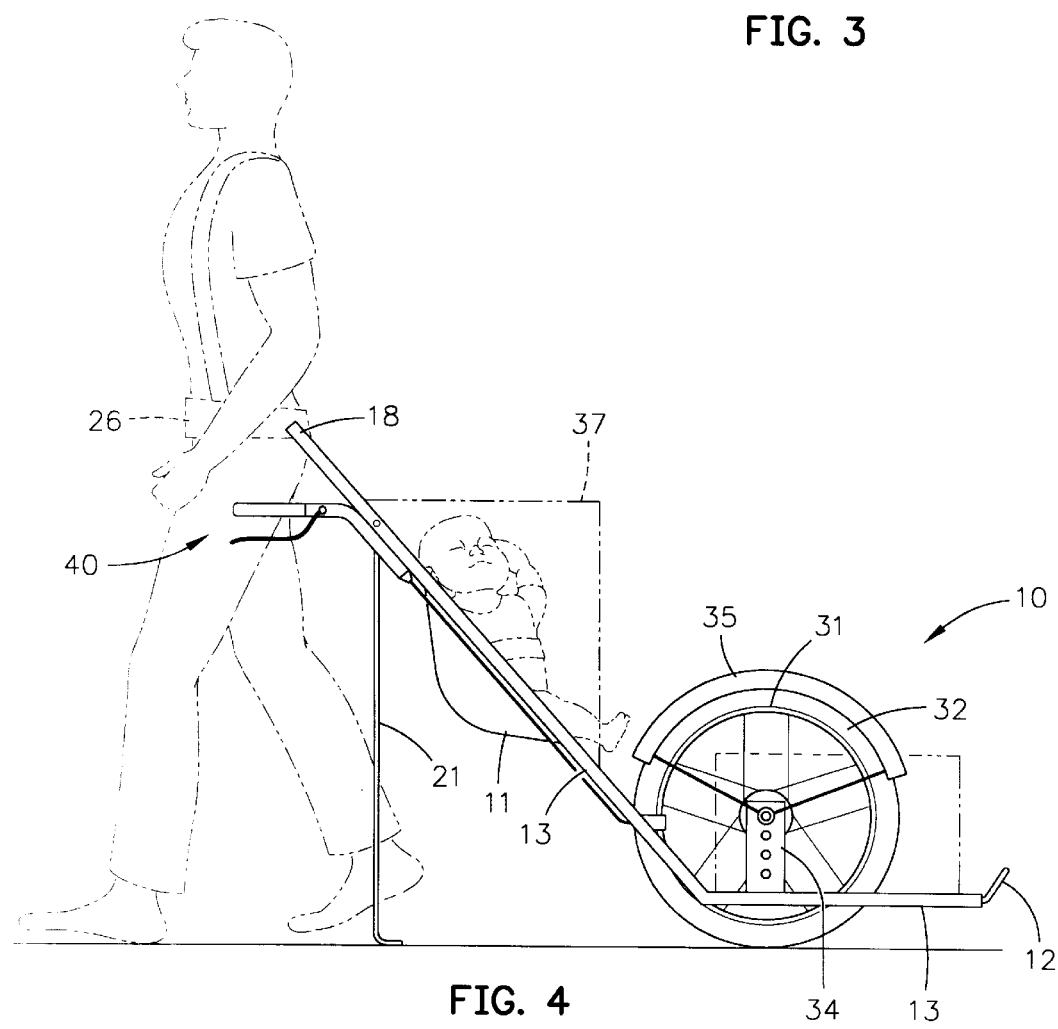
FIG. 4 is a side elevation view of an alternative embodiment of the present invention.
Figure 5:
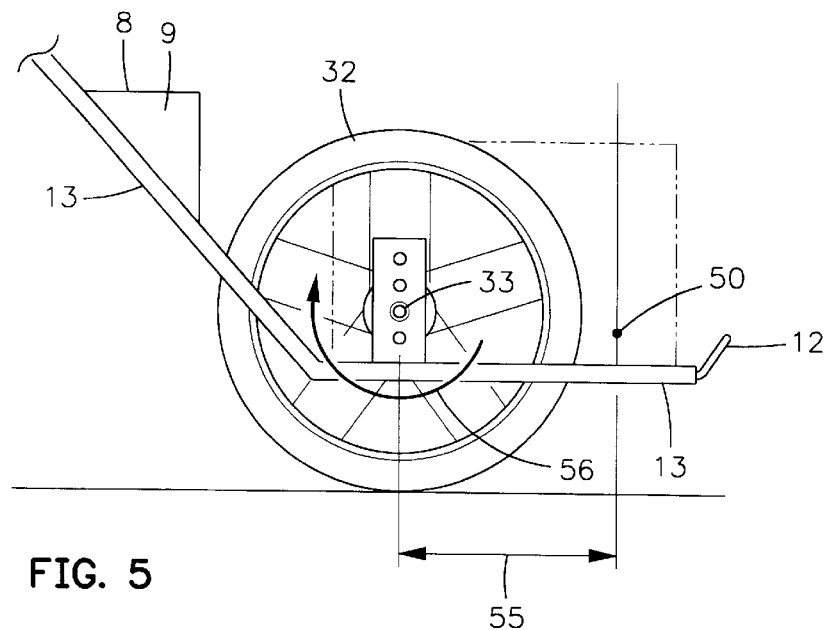
FIG. 5 is a side elevation view of the wheel assembly, rear frame section and a portion of the forward frame section showing the counterweight features of the present invention.

Referring to FIGS. 1 and 2, the travois 10 has a frame assembly comprised of a forward section 6 and a rear section 7. Both sections can be made of either tubular, box-section or other shaped elements. Preferably, the forward and rear sections, or segments are joined at an angle relative to each other, and a gusset or other means to reinforce the connection point between the forward and rear sections may be used. The forward section 6 comprises a generally rectangular framework having at least a pair of longitudinal members 13 and a number of transverse members 14 or diagonal members 15. A different arrangement of the forward section frame members may be used and the configuration is not considered part of the invention but only a necessary adjunct for assembling a frame to carry a load, or cargo. As shown in FIG. 1, a preferred embodiment of a forward section 6 would include lower longitudinal members 16 extending generally parallel to, and below longitudinal members 13. Elastic or non-elastic cord, straps, or rope 17 is wound generally crosswise to span the distance between the lower longitudinal members 16, forming a floor or support area for the cargo. As shown in FIG. 4, an alternative embodiment forward section would have a seat, or bench 11 for carrying a child, an adult, or an animal in a seated position or lying flat. Also the forward section 6 may have a foot or heel-kick unit 9 located proximate to the rear section 7, as shown in FIG. 5. The foot-kick unit would prevent the operator's feet or heels from striking the frame members while pulling the travois, and also the upper surface 8 would function as a shelf for positioning cargo thereon.

Figure 3:
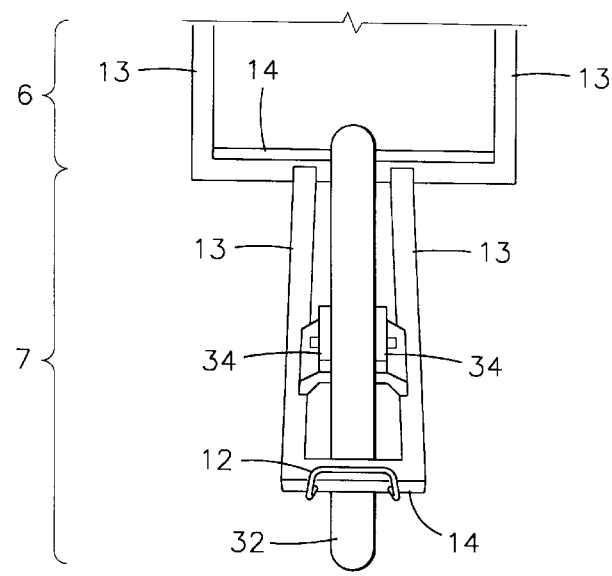
FIG. 3 is a plan view of an alternative embodiment of the rear frame section of the present invention.

As shown in FIGS. 1, 2 and 3, the rear section 7, or segment of the travois is connected to the forward section 6 and has a wheel assembly rotatably mounted therein. The rear section 7 is also comprised of longitudinal members 13 and transverse members 14 which enclose the wheel assembly. Referring to FIG. 2, the rear section 7 may maintain the width of the forward section or, as shown in FIG. 3, the rear section 7 may only be sufficiently wide to enclose the wheel assembly. At the aft-most transverse member 14 at least one and preferably two handles 12 are mounted to allow an individual following the travois to easily grasp the handles and lift the travois over large obstacles. Alternatively, the aft-most transverse member may be shaped and configured to have integral handle-like areas.

Referring to FIGS. 1 and 2, the wheel assembly comprises a flexable tire 32 mounted on a rigid inner wheel or rim 31 that is rotatably connected or coupled to an axle 33. In some embodiments, a wheel cover, or fender 35 extends over and generally follows the contour of the tire 32, with the fender connected to the forward section 6 and/or to the axle brackets 34, and/or to the rear section 7, by rods 36. The fender can cover a segment of the tire only, or alternatively, the fender can extend downwards around one or both sides of the wheel assembly, covering a segment of the tire, a segment of the rim, and any spokes or connecting means that join the rim to the axle. Preferably, the wheel assembly is a conventional unit used on mountain bikes, BMX bikes or road bikes. The rim can have a diameter ranging anywhere from approximately 20 to 28 inches and the tire can have a diameter ranging anywhere from approximately 21 to 30 inches. Alternatively, the rim and tire can have smaller or larger diameters than just described, and may be custom made, or obtained from other types of wheeled devices. Preferably, the tire has a standard inner-tube for holding air, but alternatively, the tire can be made of a rigid rubber, plastic or other material thereby making it puncture proof. When desired, a ski (not shown) can be attached either to the wheel assembly or to the frame assembly for pulling the travois 10 over snow and ice.

The wheel assembly has at its rotational center an axle 33 that is connected to the rear frame section by brackets, or uprights 34. As shown in FIGS. 1, 4 and 5, the rear section position relative to the axle is variable depending upon the intended use for the travois 10. The "country," or backpack travois requires additional ground clearance, so the span, or distance between the rear section 7 and the axle 33 is decreased, increasing the rear section ground clearance, as shown in FIG. 5. The "urban" travois needs minimal ground clearance, so the bracket length is increased. Again referring to FIG. 5, preferably brackets 34 will have pre-drilled holes for adjusting the span between the axle and the rear frame section, but completely different adjustment means may be used, such as a bracket having a vertical slot that allows infinite adjustment, or any other appropriate means for adjusting the span between the axle and the rear frame section.

Again referring to FIGS. 1 and 2, a retractable support unit, or stand comprises a pair of elongated legs 21 pivotably secured to the forward section 6 longitudinal members 13, or to the transverse members 14 near the distal end of the forward section of the travois 10. The retractable stand is provided with at least one cross-piece 22, which provides stability for the stand in its deployed mode. The retractable stand is also provided with securing members 23 to secure the retracted the stand when it is not in use. The securing members are attached to the stand, the forward section longitudinal members 13, the transverse members 14 or the lower longitudinal members 16. An alternative embodiment may use a stand positioned near the rear section 7 and designed to operate similar to a center-stand on a motorcycle wherein when the stand is deployed the travois 10 is positioned in an upright mode. When the retractable stand is deployed the operator can walk-into and walk-out-of the forward end of the travois.

The materials used to construct the frame assembly including the forward section 6, rear section 7 and the retractable stand 21 can consist of, but are not limited to: aluminum alloys, thin-wall high tensile steel tube, graphite, SPECTRA, KEVLAR, fiberglass or other composites and injection-molded plastics, or a combination thereof (KEVLAR is a trademark of Du Pont de Nemours and SPECTRA is a trademark of Allied Signal).

Referring to FIGS. 1 and 4, the forward section longitudinal members 13 have distal ends 18 for connecting to a shoulder harness or a hip harness 26. The configuration of the distal ends may vary, depending on the type of harness. In some embodiments, the distal ends would be "U" shaped to fit around a backpack external frame member. Alternatively, the distal ends may be "L" shaped, and any suitable type of fastener would be inserted through the "L," or the "U" and the harness to pivotally couple them together. As an example, a backpacking, or "country" travois embodiment would engage with a standard backpack having a shoulder harness and a hip harness, the backpack preferably having an external frame to facilitate connection with distal ends 18 of the travois. An "urban" travois embodiment may only require a hip harness 26 to carry lighter loads, but a shoulder, or hip harness or a combined shoulder-hip harness can be used in either the "urban" or "country" environment. However, completely different apparatus may be used to attach travois 10 to an operator.

As shown in FIGS. 1, 2 and 4, a brake assembly 40 comprises brake handle 41, brake lever 42, brake cable 43, and break actuator 44. The brake handle is positioned, and connected to the forward section 6 so that both the handle and lever can be easily grasped and manipulated by the operator. The brake cable connects the lever to the actuator that is positioned about the wheel assembly, and transmits braking commands to the actuator which clamps the wheel assembly. Preferably, the brake assembly components are conventional units used on mountain bikes, BMX bikes or road bikes. By way of example, the break actuator 44 could be a "V-brake", a "cantilever" brake, or a "side-pull" brake, or any equivalent thereof. The brake assembly can be actuated by the operator in either a variable mode to slow the rotation of the wheel assembly, or a non-variable mode to immobilize the wheel assembly. Also, in a preferred embodiment, an odometer (not shown) is mounted on the travois 10, and communicates with the wheel, or otherwise determines the distance traveled.

Operation

The travois 10 can be fitted with a wide variety of devices to mount a payload, or cargo onto the travois. These devices may include saddlebags or preferably "panniers," shown in phantom in FIGS. 1, and 4–7, positioned over, and on either side of the wheel assembly. For example, the "country" travois can have bags or cases placed on the forward section 6, with panniers mounted on the rear section. The "urban" travois may carry an infant, shown in phantom in FIG. 4, with or without panniers mounted on the rear section, and a canopy, or cover 37 (shown in phantom) to protect the infant from the elements. The canopy can be attached to only one, or both sides of the forward section, and it can be adjustable to cover the infant, or passenger under a wide variety of environmental conditions (for example: low-angle sunlight, or wind-driven rain).

Any combination of the above mentioned load carrying devices, or others not specifically mentioned, can be used on, or with the travois. A variety of components may be employed to secure the load to the travois, for example straps, elastic cords or belts.

Figure 6:
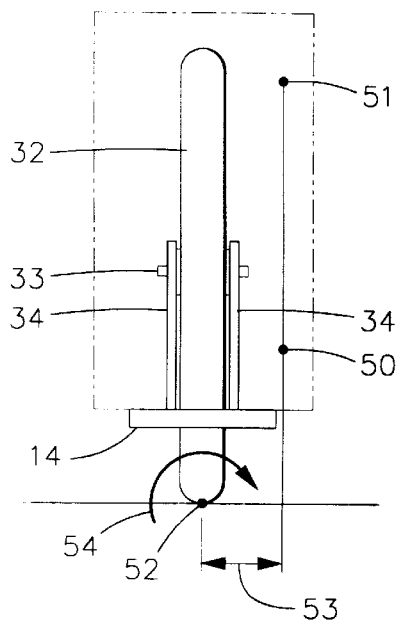
FIG. 6 is an elevation end view of the wheel assembly and a portion of the rear frame showing the stability features of the present invention.
Figure 7:
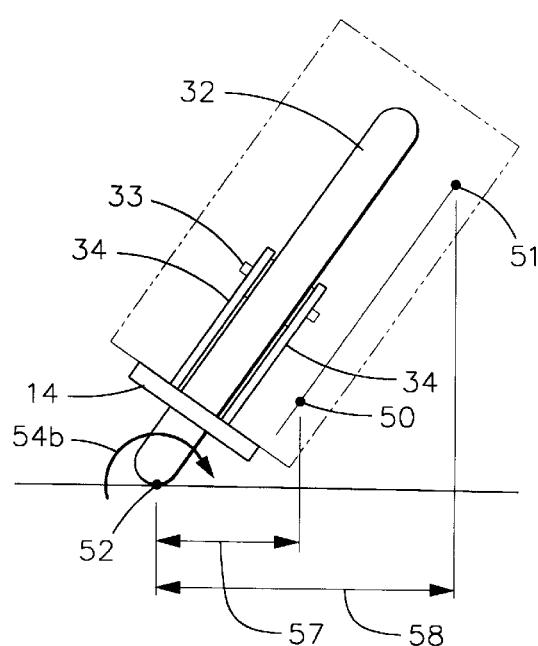
FIG. 7 is an elevation end view of the wheel assembly and a portion of the rear frame in a tilted position, showing the stability features of the present invention.

FIG. 6 depicts travois rear section 7 with the tire 32, axle 33, bracket 34 and an aft-most transverse frame member 14. The center of gravity of a low-load 50 is shown directly below the center of gravity of a high-load 51. The low-load and high-load represent the center of gravity of two different loading configurations. Transverse torque arm 53 is defined by the distance from the tire contact patch 52 to the point where the center of gravity of both loads intersects the ground when the travois 10 is not tilted. The weight of both loads pushes down on the transverse torque arm and creates a tilting torque force 54 that tilts the travois. As shown in FIG. 7, when the rear section 7 tilts, thus tilting the entire travois 10, the length of the transverse torque arm increases. Tilted low-load torque arm 57 is now slightly longer than upright torque arm 53, but tilted high-load torque arm 58 is at least twice as long as upright torque arm 53, which results in a tilting torque force 54b that is a least twice the magnitude of upright torque force 54. Therefore, by positioning the load on the travois 10 as low as possible, the tilting torque force can be minimized so that the operator can comfortably tow the travois 10. The adjustable brackets 34 enable the operator to adjust the travois rear section 7 to a desired ground clearance, thus always maintaining a minimum tilting torque force 54. For example, a "country" travois 10 would have the rear section 7 positioned approximately halfway between the ground and the axle 33, but an "urban" travois, requiring less ground clearance may have the rear section 7 positioned much closer to the ground, or surface.

Referring to FIG. 5, the rear section 7 of the travois 10 is shown adjusted for "urban" use, with the rear section positioned close to the ground. The center of gravity of low-load 50 is behind, or aft of axle 33. The distance from the tire contact patch 52 to the point where the low-load center of gravity intersects the ground defines the longitudinal torque arm 55. The weight of the low-load pushes down on the longitudinal torque arm and creates a counterweight torque force 56 that lifts the front section 6 of the travois 10. The farther aft the load can be positioned on the rear section 7, the longer the longitudinal torque arm 55 will become, and thus the larger the magnitude of the counterweight torque, which decreases the effort the operator must expend to support the travois.

Preferably, a travois according to the invention has the heavy cargo items positioned low on the rear section 7 behind the axle 33. This minimizes the tilting torque force 54 and decreases the weight on the distal end of the forward section 6 where the shoulder harness, or hip harness 26 attaches. A monowheel travois 10 loaded in this manner is stable and has a counterweight torque that decreases the weight at the forward section 6.

Other Embodiments

While I have illustrated and described the invention by means of specific embodiments, it is to be understood that numerous changes and modifications may be made therein without departing from the spirit and the scope of the invention as shown in the appended claims. For example, a different configuration of frame members may comprise the forward section, or an infinitely variable axle bracket may be employed to adjust the position of the rear section, or a solid disk may be used instead of a bicycle-type wheel assembly.

What is claimed is:

1. A travois apparatus for pulling behind an operator, comprising:
    a frame assembly having a forward section structured to be pulled by the operator; and
    a rear section coupled to the forward section and rotatable coupled to a wheel about a rotational axis, the rear section comprising at least two segments positioned on either side of the wheel, the rear section positioned below the rotational axis when the travois is being pulled by the operator.

2. The apparatus of claim 1, wherein the rear section of the frame assembly has an aft component that extends behind the axle so that when a load is placed upon the aft component a counterweight torque is produced.

3. The apparatus of claim 1, further including an axle bracket for connecting the axle to the rear section of the frame assembly whereby a span between the rear section and the axle is variable.

4. The apparatus of claim 1, further comprising attachment means for attaching the frame assembly to the operator, the attachment means selected from the group consisting of a shoulder harness, a hip harness, and a combined shoulder-hip harness.

5. The apparatus of claim 1, further comprising coupling points configured to secure to a shoulder harness or a hip harness worn by the operator, the coupling points positioned at a distal end of the forward part of the frame assembly.

6. The apparatus of claim 1, further comprising a retractable support unit pivotally coupled to the frame assembly, so that the retractable support unit can be deployed to support the travois in a stand alone position.

7. The apparatus of claim 1, further comprising a brake unit configured to operate with the wheel assembly wherein the brake unit can selectively provide either a variable braking force or a non-variable braking force to the wheel assembly.

8. The apparatus of claim 1, further comprising a seat coupled to the forward part of the frame assembly for selectively carrying either a human or animal.

9. The apparatus of claim 8, further comprising a canopy located on the forward part of the frame assembly to cover a seat occupant.

10. The apparatus of claim 1, further comprising a least one handle located about an aft-most part of the rear section, whereby the handle can be grasped by an individual.

11. An apparatus pulled over a surface by an operator, comprising:
- a frame assembly having forward and rear segments, the rear segment rotatably coupled to a wheel about a rotational axis, with the forward segment comprising upper and lower members forming a recessed area, and the rear segment comprising at least two sections positioned on either side of the wheel; and
- wherein the rear sections are located between the surface and the rotational axis, and are structured to carry a load around either side of the wheel.

12. The apparatus of claim 11, further comprising an upright joining the axle to the rear segment of the frame assembly whereby a length between the rear segment and the axle is variable.

13. The apparatus of claim 11, further comprising a retractable support unit coupled to the frame assembly so that the retractable support unit can be deployed to support the apparatus in a stand alone position.

14. The apparatus of claim 11, further comprising a brake unit configured to operate with the wheel assembly wherein the brake unit can selectively provide either a variable braking force or a non-variable braking force to the wheel assembly.

15. The apparatus of claim 11, further comprising attachment means for attaching the frame assembly to the operator, the attachment means selected from the group consisting of a shoulder harness, a hip harness, and a combined shoulder-hip harness.

16. The apparatus of claim 11, further comprising coupling points configured to attach to a shoulder harness or a hip harness worn by the operator, the coupling points positioned at a distal end of the forward part of the frame assembly.

17. An apparatus for pulling behind an operator, comprising:
- a frame for carrying a load, the frame having a forward load carrying part and a rear load carrying part comprising at least two segments positioned about two sides of a wheel;
- the wheel rotatably connected to an axle coupled to the rear load carrying part;
- a bracket adjustably engaged with the axle and coupled to the rear load carrying part, so that a span between the axle and the rear load carrying part can be varied; and
- wherein the rear load carrying part is structured to carry a load around either side of the wheel, and has an aft member that extends behind the axle so that when the load is placed upon the aft member a counterweight torque is produced.

18. The apparatus of claim 17, further comprising a support unit pivotally coupled to the forward part, so that the support unit can be deployed to support the apparatus.

19. The apparatus of claim 17, further comprising a brake unit configured to operate with the wheel and controlled by the operator, wherein the operator can select between a variable braking force and a non-variable braking force.

* * * * *